UNITED STATES PATENT OFFICE.

ALEXIS JANIN AND CHARLES W. MERRILL, OF SAN FRANCISCO, CALIFORNIA.

PROCESS OF LEACHING ORES WITH SOLUTIONS OF ALKALINE CYANIDES.

SPECIFICATION forming part of Letters Patent No. 515,148, dated February 20, 1894.

Application filed June 12, 1893. Serial No. 477,338. (No specimens.)

*To all whom it may concern:*

Be it known that we, ALEXIS JANIN and CHARLES W. MERRILL, citizens of the United States, residing in the city and county of San Francisco, State of California, have invented an Improvement in Processes of Leaching Ores with Solutions of Alkaline Cyanides; and we hereby declare the following to be a full, clear, and exact description of the same.

Our invention relates to an improvement in the art of leaching ores with solutions of alkaline cyanides and consists in, first, precipitating and separating, in the form of silver sulphide, by means of an alkaline sulphide or of sulphureted hydrogen gas, all or the greater portion of the silver dissolved from the ore by such solutions, and then precipitating in the metallic state, by means of metallic zinc, the gold contained in the same solution, together with any silver which has escaped precipitation as a sulphide.

In the usual method of leaching ores with a solution of potassium cyanide, the gold and silver extracted are both precipitated from the solution in the metallic state, with metallic zinc. When much silver is present, this method involves a large consumption of zinc and consequent contamination of the cyanide solution by the zinc dissolved, and unless the contact between the zinc and the silver bearing solution be greatly prolonged, the precipitation of the silver is imperfect. Furthermore, the potassium cyanide which combines with the zinc dissolved is practically lost. When the silver is precipitated from its solution in potassium cyanide by means of an alkaline sulphide, an alkaline cyanide is regenerated which is again available for leaching. If sulphureted hydrogen gas be used to precipitate the silver there is also formed free hydrocyanic acid, but if the solution of potassium cyanide contains free alkali, or if such be added to the solution, no free hydrocyanic acid will escape, either because the sulphureted hydrogen gas first combines with the alkali, to form a sulphide which precipitates the silver in the manner described, or because any hydrocyanic acid generated will also combine with the free alkali to form an alkaline cyanide.

We have found that, whereas silver is not precipitated at all, or only very imperfectly from strong solutions of potassium cyanide, by means of the agents hereinafter mentioned, yet when the silver bearing solution contains only about one and one-half per cent., or less of pure potassium cyanide (K C N) or its equivalent, then the silver can be thoroughly precipitated by means of the sulphides of sodium, potassium or ammonium, or by sulphureted hydrogen gas, and the precipitation of the silver becomes more imperfect as the strength of the solution in potassium cyanide is increased. Therefore when leaching silver bearing ores we employ solutions containing, at the most, two per cent. of potassium cyanide or its equivalent. As a precipitating agent we employ preferably a solution of sodium sulphide, approaching, as nearly as practicable, to the composition of a monosulphide, in order to avoid, as much as possible, the separation of free sulphur in precipitating the silver.

In practice we leach ores containing both gold and silver, with a solution of potassium cyanide containing not more than two per cent. of K C N or its equivalent, or as much weaker as is consistent with a thorough extraction. The solution, after passing through the ore, is run into precipitating vats, where a solution of sodium sulphide is added in sufficient quantity, to convert the silver present into sulphide of silver, or in a little less than that amount, in order to avoid the possibility of any excess of the precipitating agent remaining in the solution which might be prejudicial in its further use. The precipitate of silver sulphide is allowed to settle, the supernatant solution of potassium cyanide is then drawn off, and the gold, together with any silver remaining in solution, is precipitated by means of metallic zinc.

Having thus described our invention, what we claim as new, and desire to secure by Letters Patent, is—

The improvement in the art of leaching ores with solutions of alkaline cyanides which consists in first leaching the ore with such solutions, then adding to the solution an agent which will precipitate the silver present as a sulphide, and then precipitating the gold in the solution with metallic zinc, substantially as herein described.

In witness whereof we have hereunto set our hands.

ALEXIS JANIN.
CHARLES W. MERRILL.

Witnesses:
S. H. NOURSE,
WM. F. BOOTH.